United States Patent [19]

Shimizu et al.

[11] Patent Number: 5,777,308

[45] Date of Patent: Jul. 7, 1998

[54] RESOLUTION GAIN ON WIDTH MODULATED BAR CODES BY USE OF ANGLED SAMPLING IN TWO DIMENSIONS

[75] Inventors: Mark Yukio Shimizu, Seattle; Larry Lingnan Liu, Mill Creek, both of Wash.

[73] Assignee: Intermec Corporation, Everett, Wash.

[21] Appl. No.: 515,035

[22] Filed: Aug. 14, 1995

[51] Int. Cl.⁶ .................................................. G06K 7/10
[52] U.S. Cl. ...................................... 235/462; 235/463
[58] Field of Search .............................. 235/462, 463, 235/472

[56] References Cited

U.S. PATENT DOCUMENTS

| | | | |
|---|---|---|---|
| 5,343,028 | 8/1994 | Figarella et al. | 235/462 |
| 5,378,881 | 1/1995 | Adachi | 235/462 |
| 5,489,769 | 2/1996 | Kubo | 235/462 |
| 5,504,322 | 4/1996 | Pavlidis et al. | 235/494 |
| 5,545,887 | 8/1996 | Smith et al. | 235/462 |

*Primary Examiner*—Donald T. Hajec
*Assistant Examiner*—Karl Frech
*Attorney, Agent, or Firm*—Graham & James LLP

[57] ABSTRACT

A bar code imaging system provides increased resolution for accurately interpreting width modulated bar code symbols. The bar code imaging system comprises an imaging element adapted to receive light reflected from a bar code symbol and provide a two-dimensional image of the bar code symbol. The two-dimensional image is decoded into data representative of the bar code symbol. More particularly, the spacing between adjacent bar elements and adjacent space elements of said bar code symbol is measured by sampling along a diagonal line segment that intersects the adjacent bar elements. The diagonal sampling allows a greater number of pixels to be included in the measurement. If necessary, a perpendicular spacing measurement can be derived from the diagonal measurement.

21 Claims, 1 Drawing Sheet

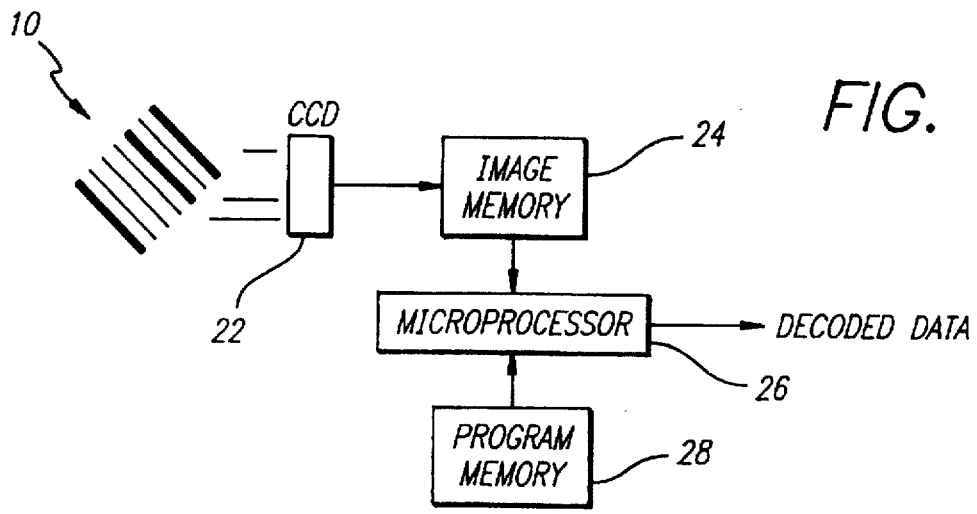
FIG. 1
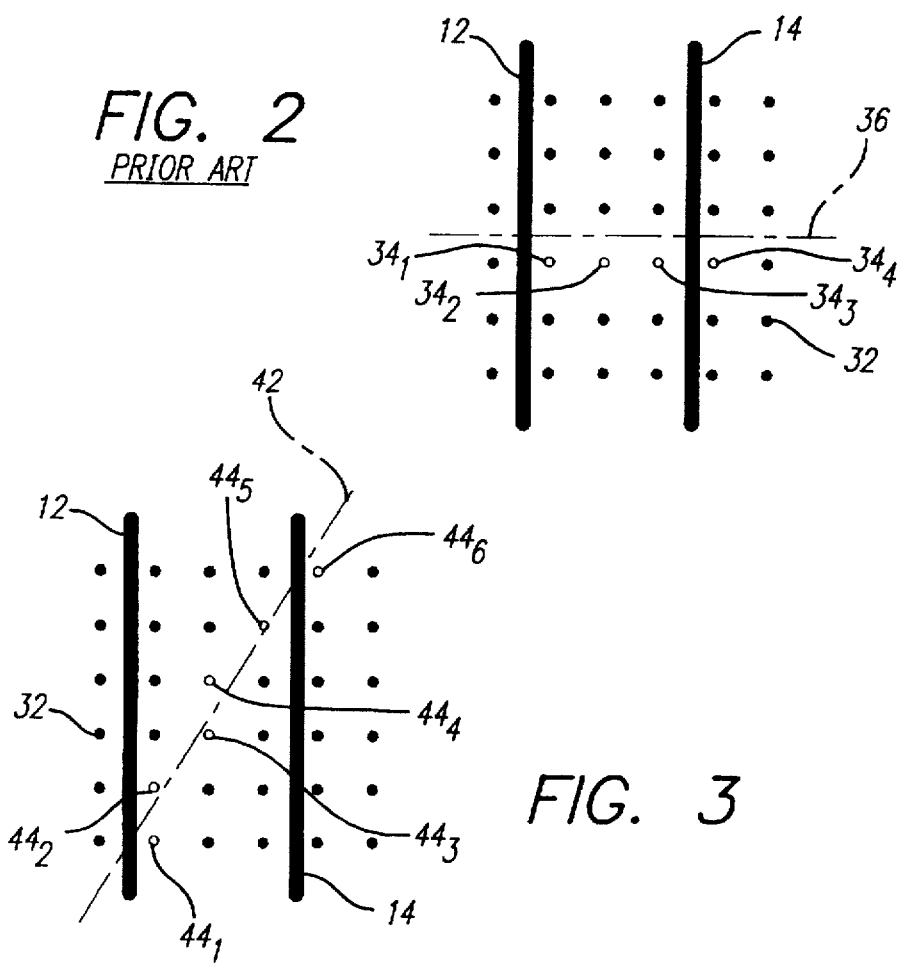
FIG. 2
PRIOR ART
FIG. 3

RESOLUTION GAIN ON WIDTH MODULATED BAR CODES BY USE OF ANGLED SAMPLING IN TWO DIMENSIONS

BACKGROUND OF THE INVENTION

1. Field of the Invention

The present invention relates to electro-optical imaging systems for reading bar code symbols, and more particularly, to a method and apparatus for improving the resolution gain of a width modulated bar code symbol by use of an angled sampling technique.

2. Description of Related Art

It is increasingly commonplace within industry to utilize bar code symbols printed on objects in order to identify the objects and convey information regarding the objects. A conventional bar code symbol comprises a pattern of vertical bars of various widths separated by spaces of various widths. The modulated widths of the bar and space elements can be interpreted by an electro-optical imaging system that converts the symbols into an electrical signal, which is then decoded to provide an alphanumeric representation of the bar code symbol. Bar code symbology of this nature are commonly used in various applications, such as inventory control, point of sale identification, or logistical tracking systems.

The electro-optical imaging system typically uses laser light that is scanned across the bar code field. Since the bar code symbology is often disposed on the object to be identified, it is desirable for the reader to be included in a hand held or portable device so that the reader can be brought to the object. Light emitting diodes (LEDs) are commonly utilized to provide the laser light due to their light weight and low power requirements. The operator can physically move the LED across the bar code field, such as by use of a light pen. Alternatively, a bar code reader may include movable mirrors that automatically articulate the laser light back and forth at a high rate to scan across the bar code field. The operator would normally be provided with a feedback signal, such as an audible tone, that alerts the operator as to the successful completion of a bar code reading operation.

Alternatively, electro-optical imaging systems can convert the entire bar code symbol into pixel information that is deciphered into the alphanumeric information represented by the symbol. Such imaging systems typically utilize charge-coupled device (CCD) technology to convert the optical information from the bar code symbol into an electrical signal representation of the symbol. CCD-based electro-optical imaging systems are preferable over laser-based imaging systems since the CCD does not require any moving elements, and is further adaptable to image advanced types of symbologies, such as two-dimensional codes, that could not be easily collected by an articulated laser. An image of the bar code symbol is optically transferred to a linear or two-dimensional array of multiple adjacent photodiodes that comprise the CCD device, with each one of the photodiodes defining a distinct picture element (or pixel) of the array. The CCD array is scanned electrically by activating the individual photodiodes in a sequential manner.

Within a CCD-based electro-optical imaging system, it is necessary to measure the distance between adjacent ones of the bar elements and adjacent ones of the space elements in order to interpret the width modulation of the bar code symbol. Conventionally, this width measurement is performed by defining a scan line that extends across the bar code field, such that the scan line lies perpendicular to each of the bar and space elements. Thereafter, the number of pixels that lie between the adjacent bar elements are counted, with the pixel count yielding a reasonably accurate estimation of the relative widths of the respective elements. Accordingly, it is necessary that the array contain a sufficiently large number of pixels to permit the narrowest element of the bar code symbol to be resolved, with the narrowest element being at least two pixels wide.

A drawback of this measurement technique is that the resolution is limited by the width of a single pixel. The measurements are necessarily rounded off to the nearest pixel, as spacing of less than a single pixel in width cannot be resolved. As a result, the CCD-based electro-optical imaging systems are incapable of detecting width distinctions between various elements of a bar code symbol that are within the one-pixel minimum range.

Another drawback is that perpendicular scanning gathers the least number of pixels for measuring the width of a bar or space element. Thus, even an error of one pixel can result in a large error in the width measurement. For example, a one pixel error in a width of two pixels is a 50% error in the width measurement.

These limitations significantly restrict the bandwidth of the width modulation of the bar code symbol, and ultimately restrains the amount of information that can be contained in a bar code symbol. While it is possible to utilize CCD arrays having higher resolution in which the individual photodiodes are smaller and closer spaced, such arrays are substantially more expensive and thus are not economically practical.

Accordingly, a critical need exists for a CCD-based electro-optical imaging system having increased resolution for accurately interpreting width modulated bar code symbols. Such an electro-optical imaging system should utilize conventional CCD array devices and be able to resolve width distinctions of less than one pixel between adjacent bar elements of a bar code symbol.

SUMMARY OF THE INVENTION

In accordance with the teachings of the present application, a bar code imaging system provides increased resolution for accurately interpreting width modulated bar code symbols.

The bar code imaging system comprises an imaging element adapted to receive light reflected from a bar code symbol and provide a two-dimensional image of the bar code symbol. The two-dimensional image is decoded into data representative of the bar code symbol. More particularly, the spacing between adjacent bar elements and the width of a bar element of said bar code symbol are measured by sampling along a diagonal line segment that intersects the adjacent bar elements. The diagonal sampling allows a greater number of pixels to be included in the measurement. A perpendicular spacing measurement can then be derived from the diagonal measurement.

A more complete understanding of the method and apparatus for improving the resolution gain of a width modulated bar code symbol will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 1 is a block diagram of an electro-optical bar code imaging system of the present invention;

FIG. 2 illustrates a measurement of bar element spacing using a prior art perpendicular sampling technique; and FIG. 3 illustrates a measurement of bar element spacing using the angled sampling technique of the present invention.

DETAILED DESCRIPTION OF THE PREFERRED EMBODIMENT

The present invention satisfies the critical need for a CCD-based electro-optical imaging system having increased resolution for accurately interpreting width modulated bar code symbols. The electro-optical imaging system utilizes conventional CCD array devices and is able to resolve width distinctions of less than one pixel between adjacent bar elements of a bar code symbol. In the detailed description that follows, like element numerals are used to describe like elements in one or more of the figures.

Referring first to FIG. 1, a block diagram of an electro-optical bar code imaging system is illustrated that includes the teachings of the present invention. The bar code imaging system permits a user to scan or read the information contained in a bar code symbol, such as the exemplary bar code symbol 10. The bar code symbol 10 comprises a pattern of parallel bar and space elements of varying widths, and with a uniform height. As known in the art, the widths of the bar and space elements can be modulated to encode alphanumeric data, which can be decoded by use of the present bar code imaging system.

The bar code imaging system comprises an imaging element 22 that is brought into proximity with the bar code symbol 10 to produce a two-dimensional image of the bar code symbol. A light source (not shown) is utilized to illuminate the bar code symbol 10. Light reflected off of the bar code symbol 10 is transmitted onto the surface of a charge-coupled device (CCD) used to generate the two-dimensional image of the bar code symbol. The CCD imaging element 22 converts the reflected image into an electrical signal. Particularly, the CCD imaging element 22 comprises a two-dimensional array of adjacent photodiodes, with each one of the photodiodes defining a distinct picture element (or pixel) of the array. It should be noted that the array is not limited to any particular pattern. For example, the array can be arranged in the usual order of linear rows and columns; the array can be arranged in a diamond pattern in which the rows are linear and the columns are offset in a regular fashion; or the array can be arranged in any other pattern in which the pixels are ordered relative to each other. Each pixel of the CCD array generates a voltage that represents the grey-scale contrast of the two-dimensional image at that particular location. The CCD array is scanned electrically by activating the individual photodiodes in a sequential manner in order to produce an output signal containing the voltage levels from each photodiodes. The detected voltage levels can then be converted to binary data values that correspond to the grey-scale contrast associated with each pixel.

The imaging element 22 transmits the binary data of the CCD array to an image memory 24 that temporarily stores the data. The image memory 24 typically comprises a semiconductor-based random access memory (RAM), and can be provided by conventional dynamic RAM (DRAM) devices. The image memory 24 permits an image from the imaging element 22 to be captured, as the reflected light onto the imaging element 22 changes due to movement of the imaging element and/or bar code symbol 10. Specifically, the binary data values produced by the CCD array are transferred into the image memory 24, and each particular data value is stored in a corresponding memory cell of the image memory. Since the image memory 24 is volatile, it will hold the data from the imaging element 22 only as long as electrical power is applied to the image memory.

The present bar code imaging system further comprises a microprocessor 26 that controls operation of the imaging system. A program memory 28 coupled to the microprocessor 26 contains an instruction set, i.e., software, that is executed in a sequential manner by the microprocessor. The software defines the operation of the imaging system, and in particular, defines the steps required to decode the data stored in the image memory 24 into usable data representative of the information contained within the bar code symbol 10. This software may also perform other related functions, such as transmitting and displaying of the decoded data.

As known in the art, the program memory 28 is provided by conventional semiconductor-based read only memory (ROM) devices. Such ROM devices are non-volatile, and permit the stored instructions to remain in storage within the devices even after electrical power is removed. It should be apparent that the functions performed by the stored program may also be accomplished by traditional hardwired logic circuits, but that software systems are preferred due to their relative simplicity, adaptability to change, and low cost. It should also be apparent that the ROM devices may further be erasable or programmable, so that modifications or revisions to the software can be implemented as desired. Moreover, other permanent storage media can be utilized as the program memory 28, such as computer disks.

The entire imaging system, including the imaging element 22, the image memory 24, the microprocessor 26 and the program memory 28, may be contained within a single unit. Alternatively, the elements may be distributed, such as with the imaging element 22 disposed in a remote device and the other elements disposed in a central unit. This way, the operator can utilize a simple, lightweight unit, such as a handheld device, that transmits the image data to the central unit for decoding. The decoded data may then be transmitted to an attached computer, stored locally for later transfer, or forwarded to an application program resident within the imaging system itself.

The operation of the present bar code imaging system will now be described with reference to FIGS. 2 and 3. In FIGS. 2 and 3, images of the boundaries of two adjacent bar elements 12 and 14 of a single bar code symbol are reflected onto an imaging element, such as the CCD element 22 of FIG. 1. The distance measurement is that of a space element formed between the two adjacent bars. Alternatively, the distance measurement could be the width of a bar element.

The CCD element comprises a plurality of photodiodes providing individual pixels, illustrated as dots 32. As a first processing step, the direction that is vertical relative to the label must be determined. That determination may be made by rotating the image so that the boundaries 12, 14 are substantially vertically disposed. However, the image need not be rotated; simply knowing the location of the bar code label within the coordinate system of the pixel is sufficient information to determine what is vertical relative to the label. The capability to determine the direction that is vertical relative to the label enables the operator of the imaging system to perform the imaging operation with the imaging element imperfectly aligned relative to the bar code symbol. The bar code symbol may include a reference character at an end or corner thereof that is recognized by the imaging system, and enables the imaging system to rotate the image data into a proper orientation. Alternatively, the imaging system may be capable of recognizing the ends of the bar code symbol due to the contrast difference of the first bar elements at either end, and rotate the bar code symbol accordingly.

After the image data is properly oriented, the next processing step is to quantize the widths of the bar and space elements. Typically, a width measurement extends between similar edge surfaces of adjacent bar elements, such as from a trailing edge of a first bar element 12 to the trailing edge of the next bar element 14. In a conventional system (FIG. 2), a line segment 36 is defined that extends axially through the bar code symbol. The line segment 36 intersects perpendicularly with each of the boundaries 12, 14 of FIG. 2, and extends in parallel with rows of pixels 32. To quantize the edge-to-edge width of the bar and space elements, the pixels lying along the line segment 34 are sampled, or counted, with the count rounded-off to the nearest pixel. In FIG. 2, pixels $34_1$, $34_2$ and $34_3$ lie substantially between the boundaries 12, 14, and pixel $34_4$ lies just beyond the trailing edge of bar element 14. Accordingly, a width measurement of four pixels can be derived. It should be apparent that this axial measurement technique can introduce an error of up to one pixel in width.

In contrast, FIG. 3 illustrates an angled sampling technique that enables a more accurate measurement of bar element spacing to be derived. In the present angled sampling technique, a line segment 42 is defined at an angle through the bar code symbol. The line segment 42 intersects diagonally with each of the boundaries 12, 14 of FIG. 3. A precise angle of the line segment 42 relative to the axial direction of the bar code symbol need not be defined, as long as the same angle is utilized for each width measurement of a particular bar code symbol. For the greatest accuracy, it is desirable to utilize an angle that is sufficiently large that the line segment 42 intersects with the boundaries 12, 14 close to their outermost ends. To quantize the edge-to-edge width of the bar and space elements, the pixels lying along the line segment 42 are sampled, with the pixel count rounded-off to the nearest pixel. In FIG. 3, pixels $44_1$, $44_2$, $44_3$, $44_4$ and $44_5$ lie substantially between the bar elements 12, 14, and pixel $44_6$ lies just beyond the trailing edge of bar element 14. Accordingly, a measurement of six pixels can be derived, as contrasted with the four pixel measurement of FIG. 2.

The angled measurement could be used to define a relative width measurement in place of the axial measurement described above, as long as the same angle is used for each adjacent bar element measurement. Alternatively, the angled measurement can be converted into an axial measurement by use of a conventional mathematical relation, known as the Pythagorean theorem. In the example of FIG. 3, there is a vertical rise of five pixels in the triangle formed by the vertical boundary 14, the diagonal line 42, and the horizontal line passing through pixel $44_1$. Therefore, an axial width of approximately 3.3 pixels can be derived, having a significantly higher level of accuracy than the four pixel measurement determined under the axial method of FIG. 2.

Having thus described a preferred embodiment of the method and apparatus for improving the resolution gain of a width modulated bar code symbol, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

What is claimed is:

1. A bar code imaging system comprising:
    an imaging element adapted to receive light reflected from a bar code symbol and provide a two-dimensional image of said bar code symbol;
    means for decoding said two-dimensional image into data representative of said bar code symbol, said decoding means comprising means for measuring spacing between elements of said bar code symbol by sampling along a diagonal line segment that intersects said elements; and
    means for selecting an angle of said diagonal line with respect to said elements of said bar code symbol.

2. The bar code imaging system of claim 1, wherein said measuring means further comprises means for counting pixels of said two-dimensional image data lying along said diagonal line segment.

3. The bar code imaging system of claim 2, wherein said measuring means further comprises means for deriving a perpendicular spacing measurement between said elements from said diagonal pixel count.

4. The bar code imaging system of claim 1, wherein said imaging element further comprises a charge-coupled device (CCD).

5. The bar code imaging system of claim 1, wherein said elements of said bar code symbol comprise bar elements.

6. The bar code imaging system of claim 1, wherein said elements of said bar code symbol comprise space elements.

7. A bar code imaging system comprising:
    an imaging element adapted to receive light reflected from a bar code symbol and provide data representing a two-dimensional image of said bar code symbol;
    an image memory coupled to said imaging element to store said two-dimensional image data;
    means for processing said stored two-dimensional image data, said processing means comprising means for measuring spacing between elements of said bar code symbol by sampling along a diagonal line segment that intersects said elements; and
    means for selecting an angle of said diagonal line with respect to said elements of said bar code symbol.

8. The bar code imaging system of claim 7, wherein said measuring means further comprises means for counting pixels of said two-dimensional image data lying along said diagonal line segment.

9. The bar code imaging system of claim 8, wherein said measuring means further comprises means for deriving an axial spacing measurement between said elements from said diagonal pixel count.

10. The bar code imaging system of claim 7, wherein said imaging element further comprises a charge-coupled device (CCD).

11. The bar code imaging system of claim 7, wherein said processing means further comprises a microprocessor.

12. The bar code imaging system of claim 7, wherein said elements of said bar code symbol include bar elements.

13. The bar code imaging system of claim 7, wherein said elements of said bar code symbol include space elements.

14. A method for measuring spacing between elements of a bar code symbol comprising the steps of:
    receiving a light pattern reflected from a bar code symbol and providing two-dimensional data corresponding to said light pattern;
    storing said two-dimensional image data;
    processing said stored two-dimensional image data by sampling along a diagonal line segment that intersects said elements; and selecting an angle of said diagonal line with respect to said elements of said bar code symbol.

15. The method of claim 14, wherein said processing step further comprises the step of counting pixels of said two-dimensional image data lying along said diagonal line segment.

16. The method of claim 15, wherein said processing step further comprises the step of deriving an axial spacing measurement between said elements from said diagonal pixel count.

17. The method of claim 14, wherein said elements of said bar code symbol include bar elements.

18. The method of claim 14, wherein said elements of said bar code symbol include space elements.

19. A bar code imaging system comprising:

an imaging element adapted to receive light reflected from a bar code symbol and provide data representing a two-dimensional image of said bar code symbol;

an image memory coupled to said imaging element to store said two-dimensional image data; and a processor coupled to said imaging element and said image memory, said processor being adapted to measure spacing between elements of said bar code symbol by sampling along a diagonal line segment that intersects said elements, and select an angle of said diagonal line with respect to said elements of said bar code symbol.

20. The bar code imaging system of claim 19, wherein said processor is further adapted to count pixels of said two-dimensional image data lying along said diagonal line segment.

21. The bar code imaging system of claim 20, wherein said processor is further adapted to derive an axial spacing measurement between said elements from said diagonal pixel count.

* * * * *